(12) United States Patent
Peigne

(10) Patent No.: US 8,721,232 B2
(45) Date of Patent: May 13, 2014

(54) RING-ROLLING BEARING WITH AXIAL DISPLACEMENT AND SHAPING TOOLING EQUIPPED WITH SUCH A BEARING

(76) Inventor: Grégoire Peigne, Sevres (FR)

(*) Notice: Subject to any disclaimer, the term of this patent is extended or adjusted under 35 U.S.C. 154(b) by 1185 days.

(21) Appl. No.: 12/306,447

(22) PCT Filed: Jun. 20, 2007

(86) PCT No.: PCT/FR2007/001024
§ 371 (c)(1),
(2), (4) Date: Sep. 14, 2009

(87) PCT Pub. No.: WO2008/000935
PCT Pub. Date: Jan. 3, 2008

(65) Prior Publication Data
US 2010/0003096 A1     Jan. 7, 2010

(30) Foreign Application Priority Data
Jun. 26, 2006 (FR) ...................................... 06 05673

(51) Int. Cl.
*B23B 47/24* (2006.01)
(52) U.S. Cl.
USPC ............................................ 408/17; 408/132
(58) Field of Classification Search
CPC ................................ B23B 47/24; B23B 47/34
USPC .................... 408/17, 132, 129; 74/25, 55–57, 74/567–568
See application file for complete search history.

(56) References Cited

U.S. PATENT DOCUMENTS

| 2,453,136 | A | * | 11/1948 | Karweit | 408/17 |
| 2,474,720 | A | * | 6/1949 | Billeter | 74/22 R |
| 2,801,550 | A | * | 8/1957 | Campbell | 74/600 |
| 3,046,801 | A | * | 7/1962 | Pravel | 74/25 |
| 3,403,668 | A | * | 10/1968 | Schottler | 123/197.2 |
| 3,443,446 | A | * | 5/1969 | Buergel | 74/56 |

(Continued)

FOREIGN PATENT DOCUMENTS

| DE | 23 45 866 A1 | 3/1975 |
| DE | 24 36 340 A1 | 3/1975 |

(Continued)

OTHER PUBLICATIONS

International Search Report from International Application PCT/FR2007/001024, mail date of Oct. 29, 2007.

*Primary Examiner* — Daniel Howell
*Assistant Examiner* — Ryan Rufo
(74) *Attorney, Agent, or Firm* — Jones Robb, PLLC

(57) ABSTRACT

A rolling bearing includes at least a first ring with an undulating rolling surface and a second ring, the rings being coaxial and given a relative rotational and reciprocating axial movement, and at least one row of rolling bodies mounted in rolling contact between the respective rolling surfaces on the rings. The rolling bearing further includes at least a third ring with an undulating rolling surface that collaborates with either the first row of rolling bodies or with a second row of rolling bodies, the second row of rolling bodies being inserted between the rolling surface of the third ring and a rolling surface of a fourth ring. At least one of the third or fourth rings is mounted to rotate as one with the first or second ring respectively, and the rings which rotate as one are mounted such that they can move axially one relative to the other.

18 Claims, 6 Drawing Sheets

(56) References Cited

U.S. PATENT DOCUMENTS

| | | | |
|---|---|---|---|
| 3,469,460 A * | 9/1969 | Mersch | 74/57 |
| 3,589,202 A * | 6/1971 | Stanley | 74/25 |
| 5,035,549 A * | 7/1991 | Asano et al. | 408/132 |
| 5,116,147 A | 5/1992 | Pajari, Sr. | |
| 5,342,152 A * | 8/1994 | Medeksza | 408/1 R |
| 2006/0222531 A1 * | 10/2006 | Mitsui | 417/415 |

FOREIGN PATENT DOCUMENTS

| | | | | |
|---|---|---|---|---|
| DE | 2345866 A * | 3/1975 | | B06B 1/10 |
| DE | 102005002460 A1 * | 7/2006 | | B23B 47/34 |
| SU | 1 161 258 A2 | 6/1985 | | |

* cited by examiner

RING-ROLLING BEARING WITH AXIAL DISPLACEMENT AND SHAPING TOOLING EQUIPPED WITH SUCH A BEARING

The present invention relates to a rolling bearing, preferably a ball rolling bearing, organized about a rotation axis, said rolling bearing comprising at least one first ring delimiting a first rolling surface and a second ring delimiting a second rolling surface, said rings being coaxial to said rotation axis and given a relative rotation movement, at least one row of rolling bodies, such as balls, mounted in rolling contact between the respective rolling surfaces provided on said rings, said rolling bodies generally being inserted in a cage to hold them together with a predetermined angular difference, the first rolling surface constituting a raceway with undulating profile, preferably sinusoidal, to impart, in (steady-state) operating mode, a reciprocating axial movement of said first and second rings relative to each other, and a shaping tool, such as a machining, milling or drilling tool, of the type comprising a tool-holder driven in operation by a motor block, said tool incorporating at least one rolling bearing of the abovementioned type.

Producing a rolling bearing able to convert a rotation movement into a reciprocating axial movement is now known to those skilled in the art.

Thus, the document U.S. Pat. No. 3,443,446 proposes a tool incorporating a rolling bearing with two rows of rolling bodies, mounted between a casing and a rotation drive shaft, this rolling bearing making it possible to give the casing a reciprocating axial movement relative to the shaft. In this solution, a collar is linked to rotate with the shaft and positioned between each row of rolling bodies. This collar presents, with respect to each row of rolling bodies, a rolling surface in wave form. There are also provided two rings, fixed to the casing, which are each furnished with a rolling surface also in wave form to enable the rolling bodies to follow the wave form of the collar. This technical solution does allow for a reciprocating axial displacement of the casing relative to the shaft, but the amplitude of this reciprocating axial displacement cannot be adjusted.

The document U.S. Pat. No. 5,116,147 describes a tool which comprises an anti-blockage rolling bearing system. In this rolling bearing system, the internal and external rolling surfaces of the rolling bodies are in saw-tooth form to generate vibrations and thus avoid the blocking of the parts of the tool that are rotating one relative to the other. However, there is no possibility of adjusting the amplitude of these vibrations.

Similarly, tools incorporating a rolling bearing making it possible to drive a tool-holder with a reciprocating movement with adjustable amplitude are already known to those skilled in the art, as illustrated in particular by the patent SU-1.161.258.

Driving a tool-holder in parallel with its rotation movement by a reciprocating movement presents a certain number of advantages, in particular in the case of an application to machining, and more particularly to drilling assisted by low-frequency vibrations.

The advantages of this reciprocating displacement are as follows, namely an easy evacuation of the chipping broken up into small sizes by the vibrations, a reduction in the cutting power, a reduction in the heating of the drill bit minimizing the need for lubricant and making it possible to increase productivity by improving the cutting conditions.

The drawback of the solution developed in patent SU-1.161.258 lies in the fact that the variation of the amplitude of the reciprocating axial movement necessarily generates a modification of the frequency of the reciprocating movement, a modification that is not desired by the operator. Furthermore, the rolling bearing is a rolling bearing dedicated to the chosen application that is difficult to transpose to another application.

One aim of the present invention is therefore to propose a rolling bearing whose design makes it possible to easily adjust the amplitude of the reciprocating movement of the rings of said rolling bearing without varying the frequency of the transmitted axial movement.

Another aim of the present invention is to propose a tool incorporating a rolling bearing of the abovementioned type whose design allows for an easy adjustment of the amplitude of the reciprocating axial movement of the tool without varying the frequency of the movement of the tool.

To this end, the subject of the invention is a rolling bearing, preferably a ball rolling bearing, organized about a rotation axis, said rolling bearing comprising at least one first ring delimiting a first rolling surface and a second ring delimiting a second rolling surface, said rings being coaxial to said rotation axis and given a relative rotation movement, at least one row of rolling bodies, such as balls, mounted in rolling contact between the respective rolling surfaces provided on said rings, said rolling bodies generally being inserted in a cage to hold them together with a predetermined angular difference, the first rolling surface constituting a raceway with undulating profile, preferably sinusoidal, to impart, in (steady-state) operating mode, a reciprocating axial movement of said first and second rings relative to each other, characterized in that it comprises at least one third rolling surface constituting a raceway with undulating profile provided on a third ring, coaxial to said first and second rings, this third rolling surface with undulating profile, provided on the third ring, cooperating either with the row, called first row of rolling bodies in contact with the first rolling surface, or with a second row of rolling bodies held together by means of a cage preferably mounted to rotate as one with the cage enclosing the first row of rolling bodies, this second row of rolling bodies being inserted between said third rolling surface of the third ring and a fourth rolling surface of a fourth ring, at least one of the third or fourth rings being mounted to rotate as one, in (steady-state) operating mode, respectively with the first or the second ring and the or both rings which rotate as one, namely the first and the third ring or the second and the fourth ring, being mounted to move axially one relative to the other so that they can be driven by a relative reciprocating axial movement, the relative angular position of the first and third rings equipped with the rolling surfaces with undulating profile determining, in collaboration with the rolling bodies, the amplitude of the axial movements of the rings which rotate as one and are driven relative to each other by a reciprocating axial movement.

It should be noted that the expression "steady-state operating mode" should be understood to mean the operating phases of the rolling bearing during which the amplitude of the reciprocating axial movement of the rings is constant.

The principle is therefore to be able, using one and the same rolling bearing, to generate a reciprocating axial movement, of an amplitude that can be adjusted, by superimposing two reciprocating axial movements of fixed amplitude and of the same frequency each generated using a rolling surface constituting a raceway with undulating profile, the adjustment of the amplitude being obtained by modifying the phase difference between the two movements and the frequency of the oscillations being given by the number of periods of the undulating rolling surfaces and the speed of rotation according to the rolling axis of the rolling bodies relative to these surfaces. Thus, at least two rings of the rolling bearing have a rolling surface that constitutes a raceway with undulating profile, preferably periodic and sinusoidal, which enables each of the two rings, by cooperation with the rolling bodies, to be driven by a relative reciprocating axial movement, called individual movement, relative to the plane containing the center of the rolling bodies, these two individual movements being added together to impart between these two rings a reciprocating axial movement of adjustable amplitude, the amplitude being a function of the phase difference between the individual movements.

According to a characteristic of the invention, the rolling surfaces with undulating profile of the first and third rings, called rings with undulating profile, face towards the rolling surface, without undulating profile, of the second or of the second and fourth rings, called smooth ring(s), these first and third rings with rolling surface with undulating profile forming either the internal rings of said rolling bearing, or the external rings of said rolling bearing.

To enable the amplitude of the transmitted axial movement to be adjusted, the relative angular position of the first and third rings, equipped with rolling surface with undulating profile, can be adjusted by angular displacement of said rings one relative to the other about the rotation axis of the rolling bearing, said rings being held in the chosen position by appropriate means, such as return means, preferably elastic.

This angular displacement can be controlled manually or automatically. In a preferred embodiment, the rings, equipped with rolling surface with undulating profile, can be displaced angularly one relative to the other and are linked through the intermediary of a motorized mechanism for driving rotation-wise one of the rings relative to the other in order to enable the amplitude of the transmitted axial movements to be adjusted.

In another embodiment, the first and third rings, equipped with rolling surface with undulating profile, can be displaced, preferably manually, angularly one relative to the other, and one of the rings, equipped with a rolling surface with undulating profile, comprises visual markers of its angular position, either relative to the other ring equipped with a rolling surface with undulating profile, or relative to a reference external to said rolling bearing to which the rolling bearing is coupled.

Obviously, the amplitude can also be adjusted definitively on construction of the rolling bearing by the choice of the angular offset between the rings.

According to another embodiment of the invention, the rolling bearing comprises two rows of rolling bodies and two of the rings that rotate as one are produced in a single piece.

In yet another embodiment of the invention, the rolling bearing comprises at least four rings and two cages of rolling bodies that can be displaced angularly one relative to the other in order to enable the amplitude of the transmitted axial movements to be adjusted.

Another subject of the invention is a shaping tool, such as a drilling, milling or machining tool, of the type comprising a tool-holder driven rotation-wise by a motor block with which it rotates as one, characterized in that the tool-holder is driven relative to the motor block by a reciprocating axial movement with amplitude that can be adjusted independently of the frequency through the intermediary of a rolling bearing of the abovementioned type, inserted between the motor block and the tool-holder.

The invention will be clearly understood on reading the following description of exemplary embodiments, with reference to the appended drawings in which.

Figure 1:
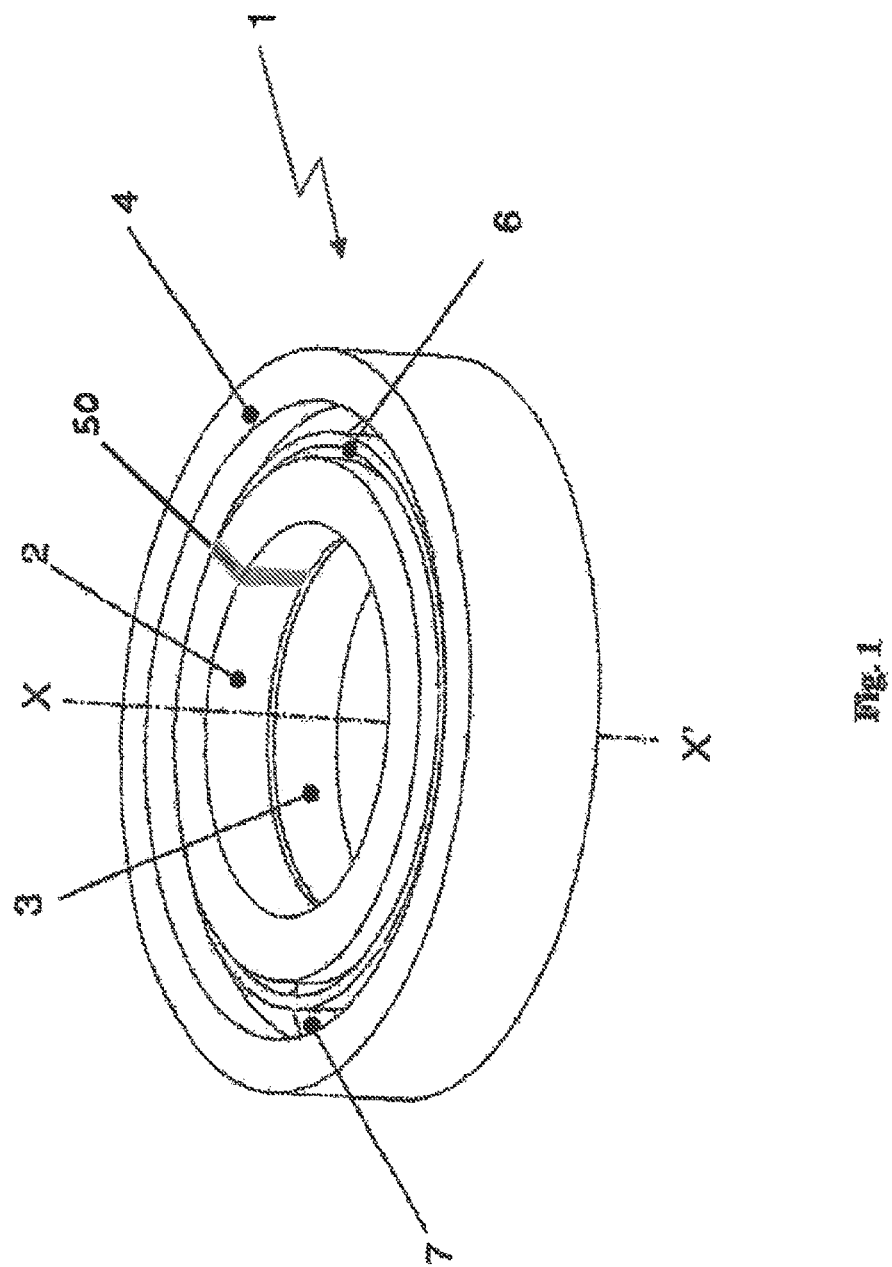
FIG. 1 represents a perspective overall view of a rolling bearing according to the invention.

As mentioned hereinabove and represented in FIG. 1, the rolling bearing 1, the subject of the invention, is organized about a rotation axis XX'. This rolling bearing 1 comprises a first ring 2 delimiting a first rolling surface and a second ring 4 delimiting a second rolling surface, coaxial to said rotation axis XX'. These rings are given a relative rotation movement and are therefore driven at different rotation speeds, this rotation speed possibly being zero for one of the rings. This rolling bearing also comprises at least one row of rolling bodies 7 comprising balls in the examples represented. However, any other rolling body, such as a roll or a barrel, can also be envisaged. This row of rolling bodies 7 is mounted between respective rolling surfaces provided on said rings 2, 4.

Figure 3:
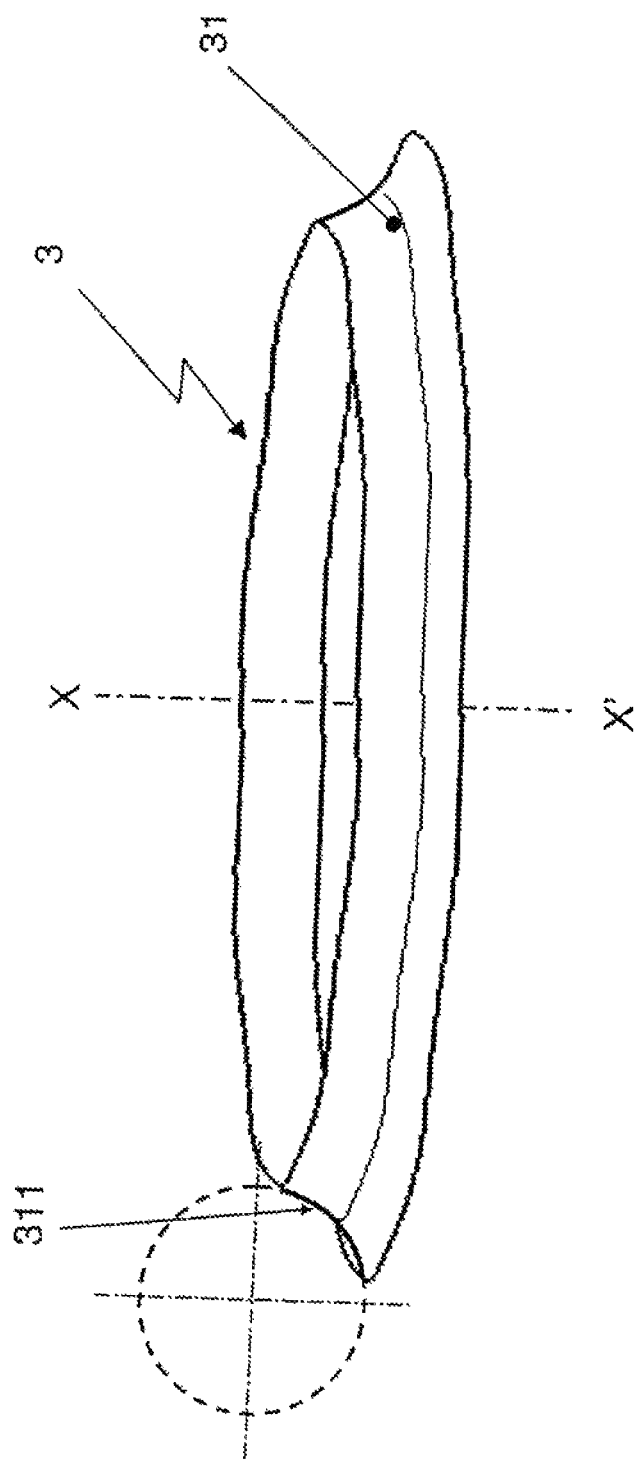
FIG. 3 represents a perspective view of a rolling surface constituting a raceway with undulating profile.

By convention, hereinafter, the numeric reference of each rolling surface will comprise two digits, the first digit corresponding to the number of the ring providing said rolling surface, the second digit comprising a 1 when the rolling surface is a surface forming a raceway with undulating profile and a 2 when the rolling surface constitutes a raceway with conventional non-undulating profile in the manner of conventional rolling bearings (circular contact line contained in a plane). Thus, in the case corresponding to the digit 2, the raceway, corresponding to the line of contact between the surface of the ring and the rolling bodies, is contained in a plane perpendicular to the rotation axis XX' of the rolling bearing whereas in the other case corresponding to the digit 1, the line of contact between the surface of the ring and the rolling bodies describes in the axial direction a sinusoid, the number of periods of which on a rotation is an integer number. Thus, to illustrate the foregoing in FIG. 3, the rolling surface 31 is the rolling surface of the ring 3, this surface being a surface having a raceway with undulating profile.

The rolling bodies 7, which are mounted between respective rolling surfaces provided on said rings 2, 4 are generally inserted into a cage 6 to hold them together with a predetermined angular difference.

The first rolling surface 21 delimited by the first rolling bearing 2 constitutes a raceway with undulating profile, preferably sinusoidal, to impart, in (steady-state) operating mode, a relative reciprocating axial movement of the first and second rings 2, 4. This first rolling surface therefore comprises periodic sinusoidal undulations on the axis XX'. These undulations delimit, on the surface of said raceway, concave sections and convex sections. The distance that separates the bottom of the concave sections and the top of the convex sections taken along the axis XX' defines the maximum possible travel of such a ring obtained by contact between balls and rolling surface. The contact between the balls and the facing rolling surfaces is generally oblique in relation to the axis XX'. This contact ensures a rolling action that is substantially without slip. When the form of the raceway is a periodic and sinusoidal form, that is, the axial component of the line of contact with the rolling bodies substantially describes a sinusoid, it is observed that, when a relative rotation movement is applied between the two rings, the height of the centers of the rolling bodies relative to the ring having the undulating rolling surface is a sinusoidal function dependent on the angular position on the axis XX' of the bodies relative to this same ring.

In a manner characteristic to the invention and as represented in FIGS. 2 and 4 to 6, the rolling bearing comprises at least one third rolling surface 31 constituting a raceway with undulating profile provided on a third ring 3, coaxial to said first and second rings 2, 4. This third rolling surface 31 with undulating profile cooperates either with the row, called first row of rolling bodies 7 in contact with the first rolling surface 21 (FIG. 2), or with a second row of rolling bodies 7' held together using a cage 6' preferably rotating as one with the cage 6 enclosing the first row of rolling bodies 7 (see FIG. 4), this second row of rolling bodies 7' being inserted between said third rolling surface 31 of the third ring 3 and a fourth rolling surface 52 of a fourth ring 5. The first and the third rings 2, 3 or the second and the fourth rings 4, 5, are then mounted to move axially one relative to the other to be able to be given a relative reciprocating axial movement. The relative position of the rings equipped with rolling surfaces with undulating profile determines, in cooperation with the rolling bodies, the amplitude of the axial movements of the rings that rotate as one and given between them a reciprocating axial movement.

Compared to the above, several embodiments of the invention can thus be envisaged and are detailed hereinbelow.

Figure 2:
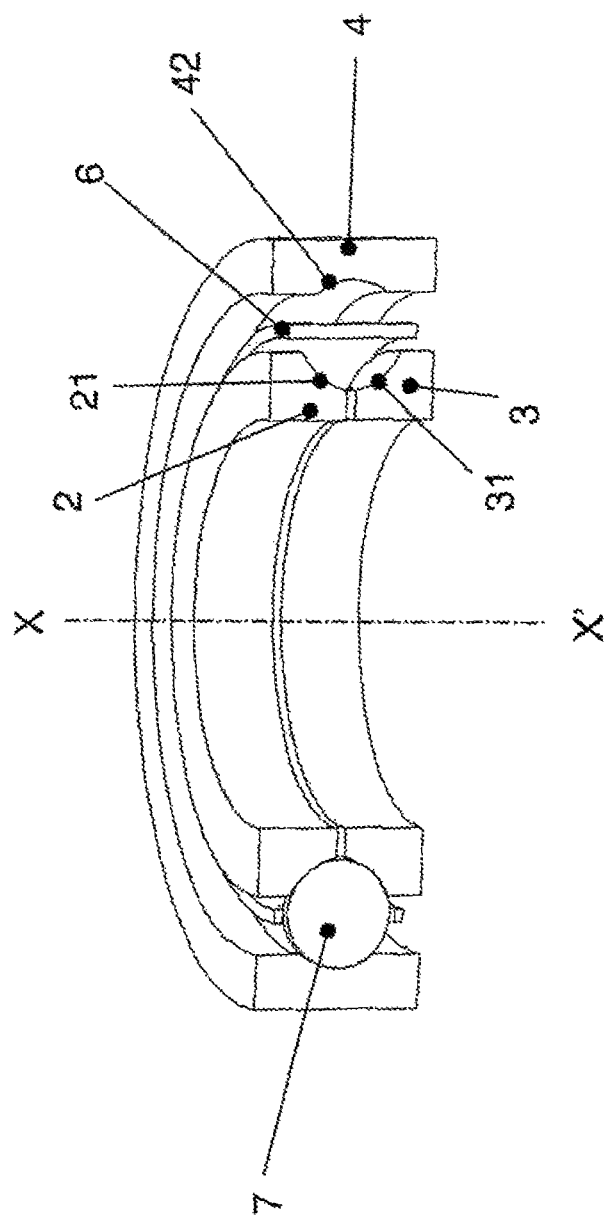
FIG. 2 represents a cross-sectional view of the three-ring rolling bearing of FIG. 1.

In a first embodiment of the invention conforming to that represented in FIG. 2, the rolling bearing comprises a third rolling surface 31 constituting a raceway with undulating profile provided on a third ring 3, coaxial to said first and second rings 2, 4 and rotating as one with the first ring 2 in steady-state operating mode. This third rolling surface 31 cooperates with the row, called first row of rolling bodies 7, in contact with the first rolling surface 21, the relative position of the rings 2, 3 equipped with rolling surfaces 21, 31 with undulating profile determining the amplitude of the axial movements transmitted by said rolling bearing. Thus, in the example represented in FIG. 2, the rings 2 and 3 forming the internal rings of the rolling bearing 1 are each furnished on their external peripheral face with a rolling surface constituting a raceway with undulating profile, preferably sinusoidal, illustrated by 21 and 31 in the figures. The external ring 4 is a ring furnished on its internal peripheral face with a conventional non-undulating rolling surface 42. Preferably, the rolling surfaces 21, 31 providing a raceway with undulating profile in generally periodic sinusoid form, have a period and amplitude that are identical from one ring to another. The rolling surface of each ring assumes substantially the form of a quarter torus or a half torus to delimit, when the rings are arranged coaxially, the cavity housing the rolling bodies 7.

As mentioned hereinabove, the rolling bearing 1 therefore has three rings: two internal rings 2, 3 and an external ring 4. The raceways 21 and 31 of the two internal rings are such that the contact between the balls and each of the surfaces is made with an oblique contact. The raceway 42 of the external ring 4 has a single point of contact with each ball, this point being the point most closely aligned with the center of the ball in a direction radial to the rolling axis.

As mentioned hereinabove, the two rings 2 and 3 have raceways of deformed toroidal form. The center of the circular section 311 (see FIG. 3) of the surface formed describes in the plane perpendicular to the rolling axis, a circle and, in the axial direction, a sinusoid with an integer number of periods. The surfaces of these two rings are preferably identical.

As mentioned hereinabove, at least one of the rolling surfaces, in this case the two rolling surfaces 21 and 31, constituting a raceway with undulating profile, each have n undulations having an axial component. These undulations have an angular symmetry of angle $2\pi/n$ about said rotation axis of the rolling bearing. The number of rolling bodies 7 is equal to the number n of undulations or to an integer sub-multiple of this number. These rolling bodies 7 are distributed equi-angularly about the rotation axis XX' of said rolling bearing 1. They are held with constant angular difference through the intermediary of a cage represented by 6 in the figures.

In the example represented in FIG. 2, the number of the balls is therefore equal to the number n of undulations and their angular difference maintained by the cage 6 is constant. In normal operation, since this rolling bearing comprises at least three rings 2, 3, 4 coaxial to the rotation axis XX' of the rolling bearing, two of the rings, in this case the rings 2, 3 with rolling surfaces 21, 31 with undulating profile, are, in steady-state operating mode, in the state driven to rotate by any one of the rings, rotating as one and given a relative rotation movement relative to the other ring 4, called smooth ring with rolling surface without undulating profile. In other words, in normal operation, the rings 2, 3 rotate as one. The rotation of these rings relative to the external ring 4, for example fixed in rotation, provokes a rolling of the balls along the rolling surfaces 21, 31, 42. During the movement, the balls travel over the undulations of the raceways 21, 31 provoking an axial displacement of each of the two internal rings 2, 3 relative to the external ring 4. When the balls are in a concave section of one of the rings, this ring is close to the external ring, then it is separated therefrom when the rotation movement continues and the balls rise to the peaks of the undulations. These two sinusoidal movements, hereinafter called individual movement of the rings 2, 3, have the same amplitude equal to the height difference between the concave sections and the peaks of the undulations of a rolling surface and have a frequency equal to the number of undulations multiplied by the relative speed of rotation of the balls about said rings.

The axial movement between the two internal rings is the sum of the two individual movements. This movement has a frequency identical to the individual movements, but the amplitude is a function of their phase difference. A zero phase difference leads to an amplitude twice the individual amplitude of each ring, whereas if the phase difference increases, the amplitude will decrease until it is zero when the phase difference reaches 180°. Obviously, it should be understood that an equivalent solution would have been obtained by having a rolling bearing with two external rings with rolling surface with raceway of undulating profile and an internal ring with rolling surface with raceway of smooth profile. Similarly, various combinations can be envisaged in terms of displacement, the final result still comprising in this three-ring embodiment, a relative axial displacement between the rings 2, 3 with undulating surface. Thus, it is possible to imagine a rolling bearing with rings 2 and 3 that rotate as one, in steady-state operating mode, which revolve, and the ring 4 fixed in rotation and free in translation or even a rolling bearing with rings 2, 3 with undulating profile fixed in rotation and given a relative axial displacement, the ring 4 being driven in rotation and mounted free in translation.

Figure 4:
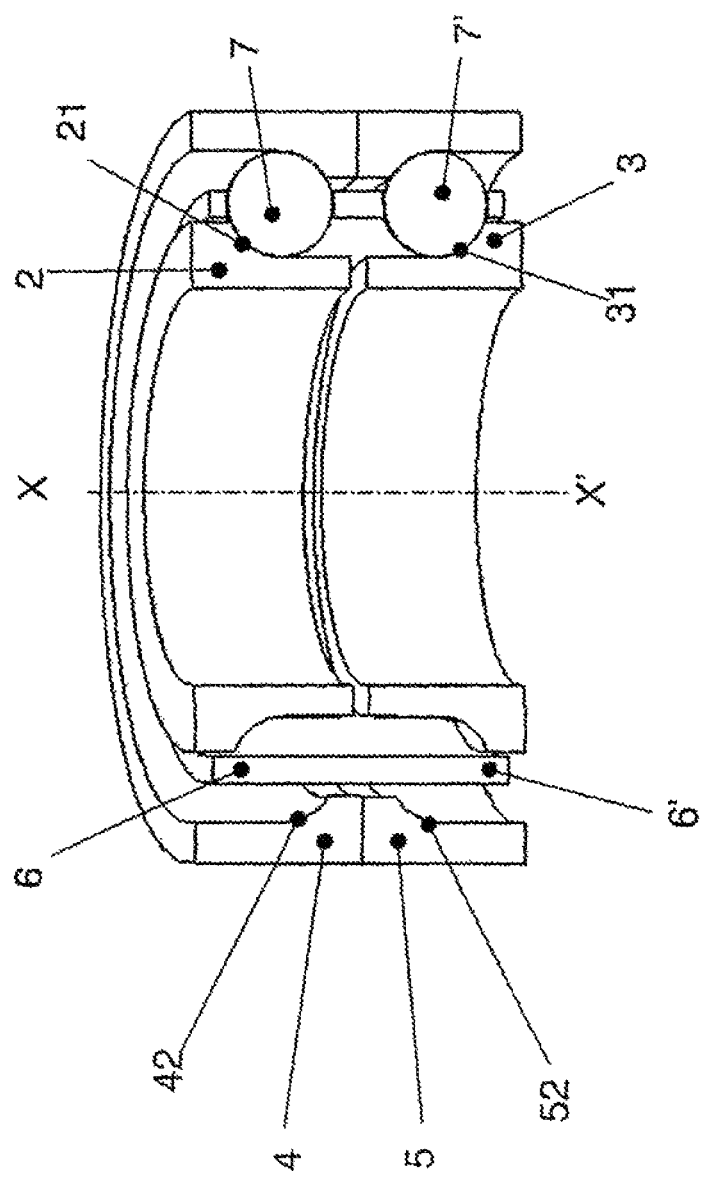
FIG. 4 represents a cross-sectional view of a rolling bearing with four rings and two rows of rolling bodies.

Another embodiment of the invention is also represented in FIG. 4. In this case, the rolling bearing 1 comprises at least one third rolling surface constituting a raceway with undulating profile provided on a third ring, coaxial to said first and second rings 2, 4, this third rolling surface cooperating with a second row of rolling bodies 7' held together using a cage 6' that rotates as one with the cage 6 enclosing the first row of rolling bodies 6. Again, the relative position of the rings equipped with rolling surfaces with undulating profile determines the amplitude of the transmitted axial movements. In the example represented in FIG. 4, the rolling bearing therefore comprises two internal rings, represented by 2 and 3 in the figures, and two external rings, represented by 4 and 5 in the figures. The rings 2 and 4 are two rings coaxial to the rotation axis of the rolling bearing and given a relative rotation movement. They comprise at least one row of rolling bodies 7, mounted between the respective rolling surfaces 21 and 42 provided on said rings 2, 4. The rolling surface 21 of the ring 2 is a rolling surface constituting a raceway with undulating profile whereas the rolling surface 42 of the ring 4 is a so-called smooth rolling surface generating no axial displacement of said ring when it comes into contact with the rolling bodies 7. The rolling bodies 7 are held between said rings, with constant deviation, through the intermediary of a cage 6. This rolling bearing 1 also comprises two other rings represented by 3 and 5 in the figures. The internal ring 3 again comprises a rolling surface 31 constituting a raceway with undulating profile whereas the external ring 5 comprises a rolling surface 52 constituting a raceway with smooth profile without undulations. A row of rolling bodies 7' is mounted between said respective rolling surfaces 31, 52 provided on the rings 3 and 5 and a cage 6' is provided to hold the rolling bodies 7' together with a predetermined angular difference. The cages 6 and 6' rotate as one. They can be formed by a single piece or two differentiated pieces coupled together to rotate as one. Similarly, the external rings 4 and 5 in this case rotate as one, in steady-state operating mode. The same applies to the internal rings 2 and 3. However, the internal rings 2 and 3 are given a relative rotation movement relative to the rings 4 and 5.

The operation of such a rolling body is similar to that described hereinabove. Again, it is the angular phase difference between the rolling surfaces 21, 31 with undulating profile of the rings 2 and 3 that determines the amplitude of the transmitted axial movements. Obviously, an equivalent solution could have been to form the rolling surfaces with undulating profile on the external rings 4 and 5 and form the rolling surfaces with smooth profile on the rings 2 and 3. In practice, the rings that rotate as one, whose rolling surfaces with raceway with undulating profile face towards the rolling surface of the smooth ring or rings, are either surrounded by the smooth ring or rings, as illustrated in FIG. 4, and constitute the internal rings of the rolling bearing, or surround the smooth ring or rings as illustrated in the rolling bearing represented in FIG. 6 and constitute the external rings of the rolling bearing.

As mentioned in the preceding case, various combinations are possible in order to obtain a relative axial displacement between the rings 2, 3 with undulating profile. Thus, the rings 2, 3 can be fixed in rotation and free in translation, the rings 4, 5 being driven in rotation and free in translation. The rings 2, 3 can also be rotating rings.

Of course, and as described hereinbelow in the embodiment of the tool represented in FIG. 7, it is also possible to provide for the relative reciprocating axial displacement to be produced between the rings that have the smooth rolling surfaces. In this case, these rings with smooth rolling surfaces are mounted to move axially one relative to the other to be able to be given a relative reciprocating axial movement. The two other rings that rotate as one which bear undulating rolling surfaces are mounted to move in translation as one.

In all of the foregoing, the rolling surfaces of the rings are considered to be in rolling bearing contact with the rolling bodies. Consequently, each time, these rings or the rolling bearing comprise generally elastic means of returning or holding the rolling surfaces of the rings in contact with said rolling bodies.

Similarly, the amplitude of the travel is adjusted between a minimum or zero value when the points of contact between the rolling bodies and an undulating rolling surface are in the concave sections whereas they are in the convex sections on the other undulating rolling surface and a maximum value when the points of contact of the rolling bodies with the two surfaces pass simultaneously over the concave sections or over the convex sections. Within these two limit values, the amplitude of the travel can be adjusted to any value by angularly offsetting the rings with undulating surfaces according to the initial angular position of the rolling bodies relative to the undulations of the two rings. In practice, the relative position of the points of contact of the rolling bodies with the respective undulating surfaces of the rings determines the amplitude of axial movement between the two rings and consequently of the transmitted axial movements.

Two examples of the application of the use of such a rolling body to a tool will now be described.

In these two examples, the shaping tool comprises a tool-holder 9 driven in operation by a motor block 8, also called motor shaft 8. The tool-holder can be connected either directly to the motor block, or via at least one interface piece. The tool-holder 9 is given a reciprocating axial movement whose amplitude can be adjusted without affecting the frequency of said movement through the intermediary of a rolling bearing 1 of the abovementioned type, inserted between the motor block 8 and the tool-holder 9. The adjustment of the amplitude of the reciprocating axial movement can be effected either manually, or automatically. In the case of a manual adjustment mode, one of the rings equipped with a rolling surface with undulating profile includes visual markers 50 of its angular position either relative to the other ring equipped with a rolling surface with undulating profile, or relative to a reference external to said rolling bearing to which the rolling bearing is coupled, this external reference generally being marked on the tool. Thus, generally, the tool comprises means of indexing a ring with rolling surface with undulating profile relative to another ring with rolling surface with undulating profile or relative to the motor block 8.

In another embodiment in which the adjustment of the amplitude of the axial movement transmitted by the rolling bearing to the tool-holder 9 is effected automatically, the rings, equipped with rolling surface with undulating profile, are linked through the intermediary of a motorized mechanism to drive one of the rings rotation-wise relative to the other in order to enable the amplitude of the transmitted axial movements to be adjusted. In this case, the tool can comprise at least one means 18 of measuring the amplitude of the reciprocating translation movement of the tool-holder 9 and means 15, 16 of controlling the relative angular position of the rings with rolling surface with undulating profile according to the amplitude determined by the measurement means 18.

These embodiments will now be described in more detail.

Figure 5:
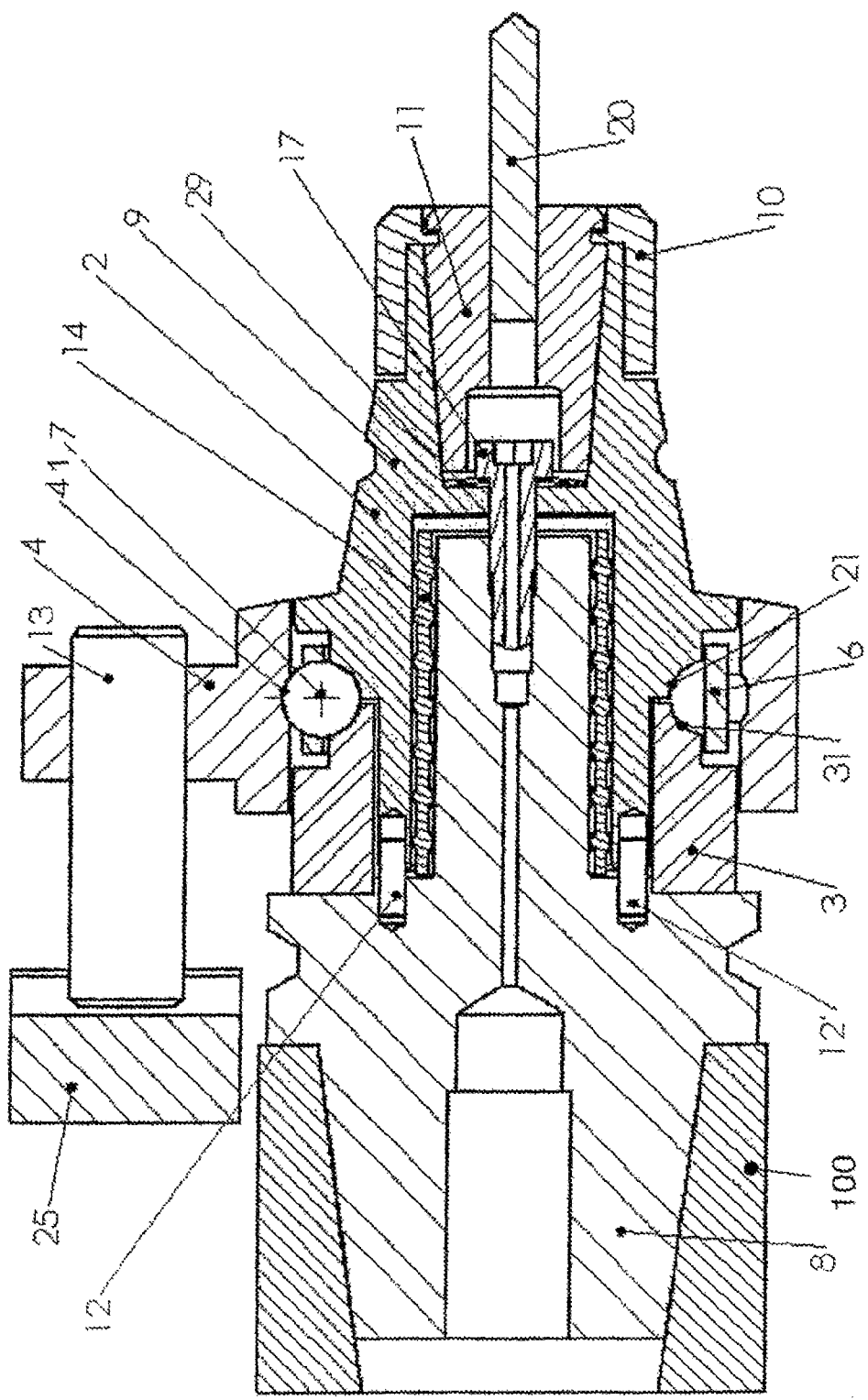
FIG. 5 represents a cross-sectional view of a tool-holder equipped with means of manually adjusting the amplitude of the transmitted axial movement and FIG. 6 represents a cross-sectional view of a tool-holder equipped with means of automatically adjusting the amplitude of the transmitted axial movement.

In the example represented in FIG. 5, the shaping tool is more particularly intended for drilling operations using a drill bit 20. This drill bit is mounted inside a tool-holder represented by 9 in the figures. This tool-holder 9, also called in this particular case chuck, can be coupled rotation-wise to the motor shaft 8 of the tool through the intermediary of pins represented by 12, 12' in the figures. The motor shaft 8 is therefore linked to the spindle rotor 100 of the machine-tool by conventional clamping means with which the spindles are equipped. When driven rotation-wise, this motor shaft 8 rotates, through the intermediary of the pins 12, 12', the chuck 9 which can be given a relative axial movement in relation to the shaft 8 thanks to the presence of a ball cage 14 which extends around the circumference of the shaft 8, in the shaft 8/chuck 9 link area. The drill bit 20 is fixed to the chuck 9 conventionally by a clamp and clamping nut system represented by 10, 11 in the figures.

To enable a reciprocating axial displacement of the chuck 9 relative to the motor shaft 8, a rolling bearing 1 conforming to the invention is inserted between the motor shaft 8 and the tool-holder 9. In the example represented, this rolling bearing is a three-ring rolling bearing. A first ring 2, called internal, comprises the chuck 9 and has a rolling surface 21 with undulating profile. Another ring, represented by 3, constitutes a second internal ring, the rolling surface 31 with raceway with undulating profile whereas the external ring, represented by 4 in the figures, has a rolling surface 42 with smooth profile. This external ring 4 is a ring that is free in translation in a direction parallel to the axis XX' of the rolling bearing but held immobilized in rotation through the intermediary of a stop index represented by 13 in the figures, clamped on 4 and being able to slide into the guide 25 joined to the casing of the spindle stator (not represented). Means maintain permanent pressure on the rings 2, 3, 4 and in particular the rolling surfaces of the rings 2, 3, 4 bearing against the rolling bodies here represented by 7. These rolling bodies 7 are held with predetermined deviation through the intermediary of a cage 6. The pressure means here comprise a clamping screw 17 and spring washers 29 which maintain a minimum pressure on the rolling bearing guaranteeing on the one hand the contact between the balls and the rings, but also sufficient adhesion to immobilize rotation-wise the adjustment ring 3 relative to the chuck 9. In drilling operations, the internal rings 2 and 3 which rotate as one, in steady-state operating mode, are driven rotation-wise by the motor shaft 8 whose rotation movement is transmitted to the ring 2 or chuck 9 by the pins 12, 12' and to the ring 3 by bearing contact, whereas the external ring 4 is maintained fixed rotation-wise. The displacement of the rolling bodies 7 along the undulating rolling surfaces then generates a reciprocating axial movement between the rings 2 and 3 that support the undulating surfaces. The chuck 9 is thus given a reciprocating axial movement. The amplitude of the oscillations of the chuck 9 is determined by the phase difference of the undulations between the two rolling surfaces 21, 31 with undulating profile of the rings 2 and 3. This phase difference is marked by graduations on the ring 3 and by a marking on the ring 2. The adjustment of the amplitude of the axial movement is modified by changing the angular position of the adjusting ring 3 relative to the chuck 9 corresponding to the ring 2. For this, it is necessary to overcome the adhesion between ring 3 and shaft 8 by forcing the ring 3 to rotate by the application of a force using a tool acting as lever arm. To this end, the adjustment ring 3 is furnished with two flaps enabling it to be held by an adjusting tool. The desired amplitude is obtained by angularly displacing the ring 3 in order to bring the corresponding graduation in line with the chosen marker on the chuck 9. This adjustment is effected manually. It would also be possible to consider taking, relative to the graduations on the ring 3, a reference on the motor shaft 8 or the external ring 4. The frequency of the axial oscillations of the drill bit is substantially equal to half the product of the rotation speed of the drill bit times the number of periods of the undulations of the undulating surfaces.

Figure 6:
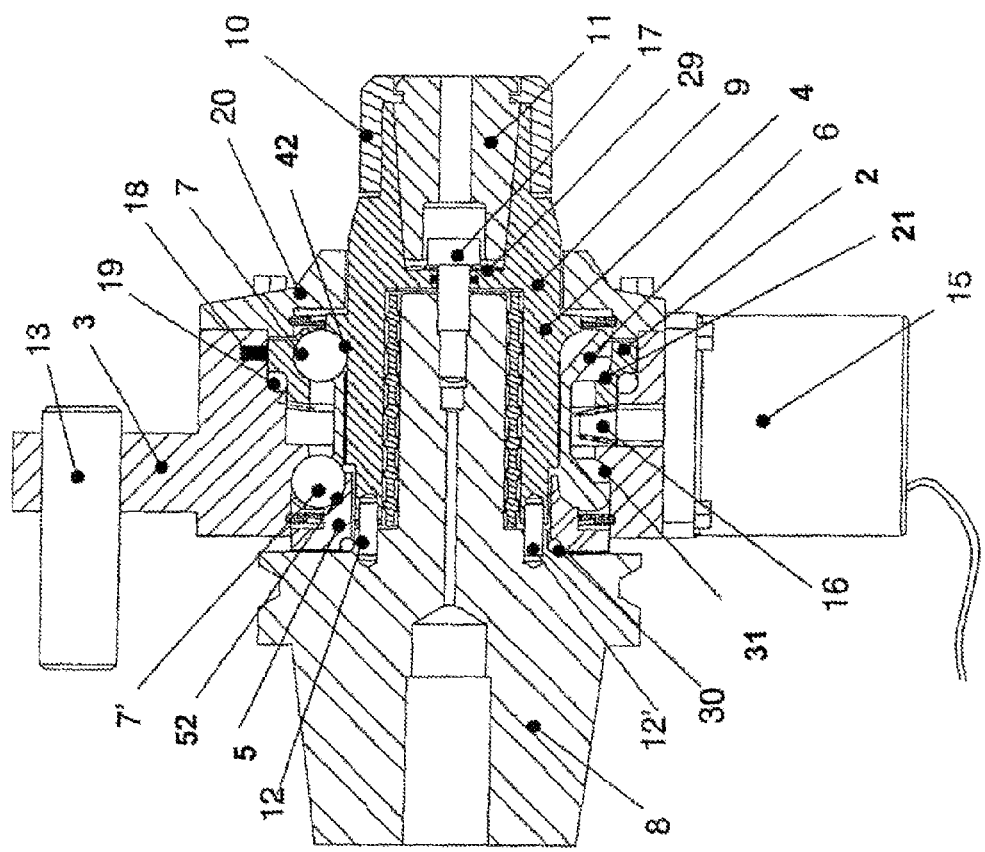

In the example represented in FIG. 6, the tool differs from that represented in FIG. 5 on the one hand by the nature of the rolling bearing, on the other hand by the method of adjusting the amplitude which is in this case an automated adjustment method. The rolling bearing 1 here comprises four rings, namely two external rings represented by 2 and 3 in the figures, these external rings comprising both an undulating rolling surface represented by 21 and 31 in the figures and two internal rings represented by 4 and 5 in the figures, one of the internal rings constituting the chuck 9, these rings being furnished with non-undulating rolling surfaces 42, 52.

The principle of the driving of the chuck 9 by the motor shaft 8 using pins 12, 12' is similar to that described previously.

The rings 3, 5 and 2, 4 cooperate with each other to house each time, between their respective rolling surfaces 31, 52, 21, 42, rolling bodies represented by 7, 7' in the figures. The latter are held with a predetermined angular difference through the intermediary of a single cage 6, this cage being either axially flexible between the two rows of rolling bodies or with openings for the balls that enable them to move axially sufficiently in order to enable the latter to follow the undulations of the undulating surfaces.

The rolling bearing 1 therefore comprises a first assembly formed by the internal ring 5, the external ring 3, the rolling bodies 7' of the cage 6 and a second so-called downstream assembly consisting of the chuck 9 or internal ring 4, the external ring 2 and rolling bodies 7 held by the same cage 6. The rings 2, 3 rotate as one, in steady-state operating mode. The external ring 3 of the upstream rolling bearing supports a motor 15 for adjusting the amplitude of the reciprocating movement and receives a thrust ball bearing 19 which is used to bear on the external ring 2 of the downstream assembly. Like the manual adjustment described hereinabove, the external ring 3 is immobilized rotation-wise and mounted free axially through the intermediary of a piece 13 clamped on the ring 3 and sliding into a groove 25 of a stationary piece fixed to the casing of the motor block. The motor shaft 8 transmits, through the intermediary of the pins 12, 12', its rotation movement to the ring 4 whereas the ring 5 is mounted free rotation-wise relative to the motor shaft 8 to which it is linked by a thrust ball bearing 30. When drilling, the ring 4 is driven rotation-wise whereas the external rings 2 and 3 are immobilized rotation-wise. Ideally, if the two stages of the rolling bearing are identical, the ring 5 is forced to revolve at the same speed as the ring 4 since the two rows of rolling bodies 7 and 7' are linked rotation-wise. In other words, the two rings 4 and 5 rotate as one, in steady-state operating mode. However, this relationship no longer applies if the different pairs of surfaces 21, 31 and 42, 52 or rolling bodies 7, 7' have differences, like those provoked by manufacturing defects. In this case, the thrust ball bearing 30 enables the ring 5 to revolve (slowly) about its axis in order to offset the rotation speed differences induced by the geometrical differences of the different rolling bearing elements. The difference in rotation speed between, on the one hand, the rings 4, 5 with non-undulating profile and, on the other hand, the rings 2, 3 with undulating profile provokes the displacement of the rolling bodies 7, 7' along the rolling surfaces 21, 31 with undulating profile, which generates the reciprocating axial movement between the rings 4 and 5 and thus gives the chuck 9 and the associated drill bit 20 a reciprocating movement. The amplitude of the oscillations is determined by the phase difference of the external rings 2 and 3. This adjustment of the amplitude of the vibrations is effected through the intermediary of the electric motor 15 able to modify the angular position of said rings. To this end, the ring 2 supports a crown gear driven by the gear wheel 16 of the motor 15. To ensure an accurate adjustment, the angular position of the ring 2 relative to the ring 3 is measured by a sensor 18. The signals controlling the motor can be routed from the machine to the tool-holder via a connection at the point of contact between the index 13 and an index-receiving piece 13.

It is also possible to split the single cage 6 into two distinct cages, each supporting a row of rolling bodies. In this case, the thrust ball bearing 30 is eliminated and the ring 5 advantageously rotates as one with the motor block 8 since the speed deviations provoked by the geometrical differences of the different elements of the rolling bearing are taken up by a difference in rotation speed between the two cages. In such a configuration, the amplitude of the oscillating movement no longer depends only on the relative angular position between the undulations of the undulating surfaces of the rings since the phase difference between the angular movements of the two assemblies also depends on the relative angular position between the two cages 6 and 6'. To ensure an accurate adjustment, the angular position of the ring 2 relative to the ring 3 is controlled by the measurement of the phase difference between the movements generated by the two assemblies, this measurement being provided by two sensors, each sensor measuring the phase of a movement.

Of course, the undulating surfaces can equally be supported by the external rings as represented in FIG. 6 or by the internal rings.

It is also possible to provide for the tool to be produced with a rolling bearing according to the embodiment represented in FIG. 4, for which the relative reciprocating axial displacement is produced between the rings with the undulating rolling surfaces. In this case, these rings with undulating rolling surfaces are mounted to move axially one relative to the other to be able to be given a relative reciprocating axial movement.

In all the foregoing, it is possible to provide for the rings that rotate as one, whose rolling surfaces with raceway of undulating profile face towards the rolling surface of the smooth ring or rings, to be either surrounded by the smooth ring or rings and constitute the internal rings of the rolling bearing, or to surround the smooth ring or rings and constitute the external rings of the rolling bearing. When it is the external rings of the rolling bearing that are furnished with rolling surfaces with undulating profile, these rolling surfaces with undulating profile are formed on the internal peripheral face of the rolling bearing, whereas, when it is the internal rings of the rolling bearing that are furnished with rolling surfaces with undulating profile, these rolling surfaces with undulating profile are formed on the external peripheral face of the rolling bearing.

The invention claimed is:

1. A rolling bearing, comprising:
a first ring comprising a first rolling surface having an undulating profile;
a second ring comprising a second rolling surface, the first and second rings being coaxial to a rotation axis and rotatable one relative to the other;
a first row of rolling bodies mounted in rolling contact between the first rolling surface and the second rolling surface, the first rolling surface being configured to impart in a steady-state operating mode a reciprocating axial movement to the first ring relative to the second ring;
a first cage in which the rolling bodies are inserted, the first cage holding the rolling bodies with a predetermined angular difference;
a third ring coaxial to the axis of rotation and comprising a third rolling surface having an undulating profile, the third rolling surface cooperating with either
the first row of rolling bodies or
a second row of rolling bodies held together by a second cage, the second row of rolling bodies being inserted between the third rolling surface and a fourth rolling surface of a fourth ring,
wherein the first and third rings or the second and fourth rings are mounted to rotate as one in the steady state operating mode and are movable axially one relative to the other so that a relative reciprocating axial movement is imparted to them by the cooperation of the rolling bodies with the first rolling surface and the third rolling surface, and
wherein the relative angular position of the first rolling surface and the third rolling surface determines an amplitude of axial reciprocating movements of the rings which rotate as one.

2. The rolling bearing of claim 1, comprising the second row of rolling bodies, and wherein the second and fourth rings are made as a single piece.

3. The rolling bearing of claim 1, wherein the first rolling surface and the third rolling surface face toward a rolling surface without an undulating profile of the second ring and/or the fourth ring, and wherein the first ring and the third ring are either internal to the rolling bearing or external to the rolling bearing.

4. The rolling bearing of claim 1, wherein the rolling bodies comprise balls.

5. The rolling bearing of claim 1, wherein the undulating profile has a generally sinusoidal shape.

6. The rolling bearing of claim 1, wherein at least one of the undulating profiles has undulations having an axial component and an angular symmetry of angle $2\pi/n$ about the rotation axis, and wherein the number of the rolling bodies is equal to the number n of undulations or to an integer sub-multiple of this number, the rolling bodies being distributed equi-angularly about the rotation axis.

7. The rolling bearing of claim 1, wherein the relative angular position of the first ring and the third ring is adjustable by angular displacement of the first ring and third ring one relative to the other, and wherein adjustment of the relative angular position governs the amplitude of the axial movements.

8. The rolling bearing of claim 1, wherein the first ring and the third ring are displaceable angularly one relative to the other, and wherein one of the first ring and the third ring comprises visual markers of the angular position of the one of the first ring and the third ring, either relative to the other of the first ring and the third ring or relative to a reference external to said rolling bearing and to which the rolling bearing is coupled.

9. The rolling bearing of claim 1, comprising the fourth ring and the second cage holding the second row of rolling bodies, the first and second cages being displaceable angularly one relative to the other in order to enable the amplitude of axial movements transmitted to a tool to be adjusted.

10. The rolling bearing of claim 1, wherein the rolling surface of each ring has substantially the shape of a quarter torus or of a half torus to delimit at least one cavity to house the rolling bodies.

11. The rolling bearing of claim 1, wherein the undulating surfaces are substantially identical.

12. A shaping tool comprising:
a tool-holder driven in rotation by a motor block with which the tool-holder rotates as one, the tool-holder being driven relative to the motor block by a reciprocating axial movement with an amplitude that is adjustable independently of a frequency of the reciprocating axial movement via the rolling bearing of claim 1 inserted between the motor block and the tool-holder.

13. The shaping tool of claim 12, further comprising means for indexing one of the first and third rings relative to the other of the first and third rings or relative to the motor block.

14. The shaping tool of claim 12, further comprising means for measuring the amplitude of the reciprocating axial movement of the tool-holder and means for controlling a relative angular position of the first and third rings according to the amplitude.

15. A shaping tool comprising:
a rolling bearing, comprising:
- a first ring comprising a first rolling surface having an undulating profile;
- a second ring comprising a second rolling surface, the first and second rings being coaxial to a rotation axis and rotatable one relative to the other;
- a first row of rolling bodies mounted in rolling contact between the first rolling surface and the second rolling surface, the first rolling surface being configured to impart in a steady-state operating mode a reciprocating axial movement to the first ring relative to the second ring;
- a first cage in which the rolling bodies are inserted, the first cage holding the rolling bodies with a predetermined angular difference;
- a third ring coaxial to the axis of rotation and comprising a third rolling surface having an undulating profile, the third rolling surface cooperating with a second row of rolling bodies held together by a second cage, the second row of rolling bodies being inserted between the third rolling surface and a fourth rolling surface of a fourth ring,
- wherein the first and third rings or the second and fourth rings are mounted to rotate as one in the steady state operating mode and are movable axially one relative to the other so that a relative reciprocating axial movement is imparted to them by the cooperation of the rolling bodies with the first rolling surface and the third rolling surface, and
- wherein the relative angular position of the first rolling surface and the third rolling surface determines an amplitude of axial reciprocating movements of the rings which rotate as one; and
a tool-holder driven in rotation by a motor block with which the tool-holder rotates as one, the tool-holder being driven relative to the motor block by a reciprocating axial movement with an amplitude that is adjustable independently of a frequency of the reciprocating axial movement via the rolling bearing inserted between the motor block and the tool-holder,
wherein two of the rings are internal and the other two of the rings are external, and the first and second rows of rolling bodies are linked in rotation, the motor block driving rotation-wise one of the internal rings, a thrust ball bearing being provided between the other internal ring of the rolling bearing and the motor block.

16. The shaping tool according to claim 12, wherein the shaping tool is one of a drilling, milling or machining tool.

17. A rolling bearing, comprising:
- a first ring comprising a first rolling surface having an undulating profile;
- a second ring comprising a second rolling surface, the first and second rings being coaxial to a rotation axis and rotatable one relative to the other;
- a first row of rolling bodies mounted in rolling contact between the first rolling surface and the second rolling surface, the first rolling surface being configured to impart in a steady-state operating mode a reciprocating axial movement to the first ring relative to the second ring; and
- a third ring coaxial to the axis of rotation and comprising a third rolling surface having an undulating profile, the third rolling surface cooperating with the first row of rolling bodies, the first and third rings being mounted to rotate as one in the steady state operating mode and being movable axially one relative to the other so that a relative reciprocating axial movement is imparted to them by the cooperation of the rolling bodies with the first rolling surface and the third rolling surface,
wherein the relative angular position of the first rolling surface and the third rolling surface determines an amplitude of axial reciprocating movements of the rings.

18. A rolling bearing, comprising:
a first ring comprising a first rolling surface having an undulating profile;
a second ring comprising a second rolling surface, the first and second rings being coaxial to a rotation axis and rotatable one relative to the other;
a first row of rolling bodies mounted in rolling contact between the first rolling surface and the second rolling surface, the first rolling surface being configured to impart in a steady-state operating mode a reciprocating axial movement to the first ring relative to the second ring;
a third ring coaxial to the axis of rotation and comprising a third rolling surface having an undulating profile;
a fourth ring coaxial to the axis of rotation and comprising a fourth rolling surface; and
a second row of rolling bodies cooperating with the third rolling surface and being inserted between the third rolling surface and the fourth rolling surface,
wherein the first and third rings or the second and the fourth rings are mounted to rotate as one in the steady state operating mode and being movable axially one relative to the other so that a relative reciprocating axial movement is imparted to them by the cooperation of the first and second rows of rolling bodies respectively with the first rolling surface and the third rolling surface, and
wherein the relative angular position of the first rolling surface and the third rolling surface determines an amplitude of axial reciprocating movements of the rings which rotate as one.

* * * * *